(12) United States Patent
Simon et al.

(10) Patent No.: US 9,298,688 B1
(45) Date of Patent: Mar. 29, 2016

(54) NON-COLLABORATIVE FILTERS IN A COLLABORATIVE DOCUMENT

(71) Applicant: Google Inc., Mountain View, CA (US)

(72) Inventors: Benjamin Wolfe Simon, New York, NY (US); Manuel Tragut, New York, NY (US); Zachary Erik Lloyd, Brooklyn, NY (US); Joshua Ari Danziger, Metuchen, NJ (US); Daniel Gundrum, New York, NY (US)

(73) Assignee: GOOGLE INC., Mountain View, CA (US)

( * ) Notice: Subject to any disclaimer, the term of this patent is extended or adjusted under 35 U.S.C. 154(b) by 388 days.

(21) Appl. No.: 13/900,270

(22) Filed: May 22, 2013

(51) Int. Cl.
*G06F 15/16* (2006.01)
*G06F 17/24* (2006.01)

(52) U.S. Cl.
CPC .................................... *G06F 17/246* (2013.01)

(58) Field of Classification Search
None
See application file for complete search history.

(56) References Cited

U.S. PATENT DOCUMENTS

| | | | |
|---|---|---|---|
| 6,212,549 B1 | 4/2001 | Page et al. | |
| 7,233,951 B1 | 6/2007 | Gainer et al. | |
| 8,190,987 B2 | 5/2012 | Campbell et al. | |
| 8,275,974 B2 | 9/2012 | Voshell | |
| 2005/0114169 A1 | 5/2005 | Ansari | |
| 2006/0129914 A1 | 6/2006 | Ellis et al. | |
| 2008/0083014 A1 | 4/2008 | Lim | |
| 2009/0112990 A1* | 4/2009 | Campbell et al. | 709/205 |
| 2010/0185733 A1 | 7/2010 | Hon et al. | |
| 2011/0078246 A1 | 3/2011 | Dittmer-Roche | |
| 2012/0192055 A1 | 7/2012 | Antebi et al. | |

FOREIGN PATENT DOCUMENTS

WO WO-2008/025167 3/2008

OTHER PUBLICATIONS

International Search Report and Written Opinion for Application No. PCT/US2014/038934, dated Feb. 17, 2015, 25 pages.

* cited by examiner

*Primary Examiner* — Scott Baderman
*Assistant Examiner* — Asher Kells
(74) *Attorney, Agent, or Firm* — Ropes & Gray LLP

(57) ABSTRACT

Systems and methods for processing user actions on a collaborative spreadsheet include accessing an unfiltered sheet of a spreadsheet stored on a server to display on a client computer, where a plurality of filters is associated with the unfiltered sheet, and receiving a selection by a user of a first filter in the plurality of filters to be applied to the unfiltered sheet. A filtered sheet is displayed to the user, where the filtered sheet is obtained by applying the first filter to the unfiltered sheet. User actions inputted by a user on the client computer are received that reference cells of the unfiltered sheet. User actions are sent to the server and transformed against the first filter. The display of the filtered sheet is updated based on the transformed user action.

9 Claims, 14 Drawing Sheets

400

402

| | A | B | C | D | E |
|---|---|---|---|---|---|
| 1 | Name | Gender | Age | Score | |
| 2 | Nick | M | 24 | 8 | |
| 3 | Christina | F | 21 | 5 | |
| 4 | Melissa | F | 22 | 7 | |
| 5 | Tyrone | M | 18 | 3 | |
| 6 | Mary | F | 26 | 9 | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| 21 | | | | | |
| 22 | | | | | |
| 23 | | | | | |

| | A | B | C | D | E |
|---|---|---|---|---|---|
| 1 | Name ▼ | Gender ▼ | Age ▼ | Score ▼ | |
| 2 | Nick | | | 8 | |
| 3 | Christina | | | 5 | |
| 4 | Melissa | | | 7 | |
| 5 | Tyrone | | | 3 | |
| 6 | Mary | | | 9 | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| 21 | | | | | |
| 22 | | | | | |
| 23 | | | | | |

Popup overlay (labels 502, 504, 506, 508, 510, 512, 514):

Sort Smallest → Largest
Sort Largest → Smallest   — 506

Filter : Select All  Clear — 508

(search box) — 510

✓ 18
✓ 21
✓ 22   — 512
✓ 24
✓ 26

[ Ok ]  [ Cancel ] — 514

| | A | B | C | D | E |
|---|---|---|---|---|---|
| 1 | Name ▼ | Gender ▼ | Age ▼ | Score ▼ | |
| 2 | Christina | F | 21 | 5 | |
| 3 | Melissa | F | 22 | 7 | |
| 4 | Nick | M | 24 | 8 | |
| 6 | Mary | F | 26 | 9 | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| 21 | | | | | |
| 22 | | | | | |
| 23 | | | | | |
| 24 | | | | | |

| | A | B | C | D | E |
|---|---|---|---|---|---|
| 1 | Name ▼ | Gender ▼ | Age ▼ | Score ▼ | |
| 2 | Christina | F | 21 | 5 | |
| 3 | Melissa | F | 22 | 7 | |
| 4 | Nick | M | 24 | 8 | |
| 6 | Mary | F | 26 | 9 | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| 21 | | | | | |
| 22 | | | | | |
| 23 | | | | | |
| 24 | | | | | |

Filters - Sheet 1  [X] — 702

No Filter ▼ — 704

Over 20 ▼ — 706

Filter 2 — 710

Duplicate
Rename
Delete
Make Default — 708

Create New Filter — 712

FIG. 7

NON-COLLABORATIVE FILTERS IN A COLLABORATIVE DOCUMENT

BACKGROUND

Cloud computing services provide a way for multiple people at multiple locations to collaborate on the same document. The cloud computing service stores a master copy of documents on one or more data servers and users access the documents over a remote network, such as the Internet. Documents that may be created, stored, and edited on a cloud computing service include word processing documents, presentation documents, and spreadsheets. When a user accesses a document stored on the cloud computing service, a local copy of the document is loaded on the client computer. Changes to the document made by the user are communicated to the cloud computing server for recordation. If two or more collaborators are editing the same document at the same time, changes made by one user are quickly propagated to the other users as well.

Collaborative spreadsheets accessible on cloud computing services may have many of the same functions as spreadsheets available on stand-alone computers. Available functions may include the use of filters to alter how data is arranged and displayed. For example, filters may be used to order rows or columns of data in a certain fashion and may be used to hide certain rows or columns from view. A filter may be considered an edit, or mutation, to the sheet just as other mutations, such as cell entries, and row/column insertions or deletions. When a user editing a collaborative spreadsheet applies a filter to the spreadsheet, the filter is also sent to other collaborators and applied to their copy of the spreadsheet. Thus a collaborator's view of the spreadsheet will automatically change when the user applies a filter. This may be a hindrance to other collaborators who are viewing data that is affected by the filter. In addition, if two or more collaborators want to apply different filters that affect overlapping sets of data, there is no way for both collaborators to apply the desired filters without interfering with each other. Also, there is no way for the collaborators of the spreadsheet to store multiple filters and apply the filters independently of each other.

SUMMARY

The systems and methods described herein provide a way for multiple collaborators to independently utilize filters for spreadsheets stored on a cloud computing service. The cloud computing service stores a spreadsheet file, which may contain one or more sheets of cells. The cloud computing service also stores a number of filters for each sheet. The filters may be created and saved by any collaborator with write access to the spreadsheet. The filters may be instructions to sort, hide, or otherwise arrange rows and cells from the display of the sheet. A user on a client computer loads a local copy of a sheet of the spreadsheet and its associated filters from the cloud computing service. The sheet is displayed on a user interface at the client computer, for example on a web browser. The available filters may be displayed on a sidebar window. When the user selects a filter to apply to the sheet, the filter is applied to the local copy of the sheet only and displayed to the user. The filter selection is not communicated to the other collaborators, unlike normal edits to the sheet. The cloud computing service may keep track of the filters that different collaborators are currently using, but the master copy of the sheet that is stored is not affected by user selection of filters. Users may set a default filter for the sheet, may remove all filters applied to a sheet, and may create, edit, rename, duplicate, or delete filters. Edits, or mutations, to a filtered sheet made by the user may be stored by the client computer either in reference to the unfiltered sheet or the filtered sheet. If mutations are referenced to the unfiltered sheet, the mutations may be sent directly to the cloud computing service for storage and to other collaborator client computers, which transform the mutations against any filters applied on the collaborator client computer before displaying the mutation to the collaborator. If mutations are referenced to the filtered sheet, they are transformed against the inverse of the filter before being sent to the cloud computing service and the collaborator client computers. Thus multiple collaborators may view multiple filters applied to the same sheet at the same time.

One aspect described herein discloses a method for processing user actions on a collaborative spreadsheet. The method includes accessing an unfiltered sheet of a spreadsheet stored on a server to display on a client computer, where a plurality of filters is associated with the unfiltered sheet, and receiving a selection by a user of a first filter in the plurality of filters to be applied to the unfiltered sheet. The method further includes displaying a filtered sheet to the user, where the filtered sheet is obtained by applying the first filter to the unfiltered sheet, and receiving a user action inputted by a user on the client computer, where the user action references cells of the unfiltered sheet. The method further includes sending the user action to the server, transforming the user action against the first filter, and updating the display of the filtered sheet based on the transformed user action.

Another aspect described herein discloses a method for receiving collaborator actions on a collaborative spreadsheet. The method includes accessing an unfiltered sheet of a spreadsheet stored on a server to display on a client computer, where a plurality of filters is associated with the unfiltered sheet, receiving a selection by a user of a first filter in the plurality of filters to be applied to the unfiltered sheet, and displaying a filtered sheet to the user, where the filtered sheet is obtained by applying the first filter to the unfiltered sheet. The method further includes receiving a collaborator action from the server, where the collaborator action references cells of the unfiltered sheet, transforming the collaborator action against the first filter, and updating the display of the filtered sheet based on the transformed collaborator action.

Another aspect described herein discloses a method for processing user actions on a collaborative spreadsheet. The method includes accessing an unfiltered sheet of a spreadsheet stored on a server to display on a client computer, where a plurality of filters is associated with the unfiltered sheet, receiving a selection by a user of a first filter in the plurality of filters to be applied to the unfiltered sheet, and displaying a filtered sheet to the user, where the filtered sheet is obtained by applying the first filter to the unfiltered sheet. The method further includes receiving a user action inputted by a user on the client computer, where the user action references cells of the filtered sheet, updating the display of the filtered sheet based on the user action, transforming the user action against an inverse of the first filter, and sending the transformed user action to the server.

Another aspect described herein discloses a system for processing user actions on a collaborative spreadsheet. The system includes a client computer configured to communicate with a server hosting a cloud computing service through a communication connection, access an unfiltered sheet of a spreadsheet stored on the server, where a plurality of filters is associated with the unfiltered sheet, receive a selection by a user of a first filter in the plurality of filters to be applied to the unfiltered sheet, and display a filtered sheet to the user, where the filtered sheet is obtained by applying the first filter to the unfiltered sheet. The client computer is further configured to receive a user action inputted by a user on the client computer, where the user action references cells of the unfiltered sheet, send the user action to the server, transform the user action against the first filter, and update the display of the filtered sheet based on the transformed user action.

BRIEF DESCRIPTION OF THE DRAWINGS

The methods and systems may be better understood from the following illustrative description with reference to the following drawings in which:

FIG. 4 shows a sheet of a collaborative spreadsheet stored on a cloud computing service in accordance with an implementation as described herein;

FIG. 5 shows filter options for a sheet of a collaborative spreadsheet stored on a cloud computing service in accordance with an implementation as described herein;

FIG. 6 shows a filtered sheet of a collaborative spreadsheet stored on a cloud computing service in accordance with an implementation as described herein;

FIG. 7 shows a sidebar window for applying filters to a sheet of a collaborative spreadsheet stored on a cloud computing service in accordance with an implementation as described herein;

DETAILED DESCRIPTION

To provide an overall understanding of the systems and methods described herein, certain illustrative embodiments will now be described, including systems and methods for providing independent use of filters by collaborators on a collaborative spreadsheet stored on a cloud computing service. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out amongst the various computing devices.

Aspects of the systems and methods described herein relate to ways of providing multiple collaborators with the ability to independently utilize filters for collaborative spreadsheets stored on a cloud computing service. The cloud computing service stores a spreadsheet file containing one or more sheets of data. The cloud computing service also stores a number of filters for each sheet. The filters may be created and saved by any collaborator with write access to the spreadsheet. The filters may be instructions to sort or hide certain values from the display of the sheet. A user on a client computer uses a web browser to load a local copy of a sheet of the spreadsheet and its associated filters from the cloud computing service. The filters are displayed on a filter interface within the web browser, for example on a sidebar window. When the user selects a filter to apply to the sheet, the filter is applied to the local copy of the sheet only and displayed to the user. The filter selection is not communicated to the other collaborators, unlike normal edits to the sheet. Thus each collaborator may independently select and view different filters. Users may use the filter interface to set a default filter for the sheet, remove all filters applied to a sheet, and create, edit, rename, duplicate, or delete filters. Edits, or mutations, to a filtered sheet made by the user may be stored by the client computer either in reference to the unfiltered sheet or the filtered sheet. If mutations are referenced to the unfiltered sheet, the mutations may be sent directly to the cloud computing service for storage and to other collaborator client computers, which transform the mutations against any filters applied on the respective collaborator client computer before displaying the mutation to the collaborator. If mutations are referenced to the filtered sheet, they are transformed against the inverse of the filter before being sent to the cloud computing service and the collaborator client computers.

Figure 1:
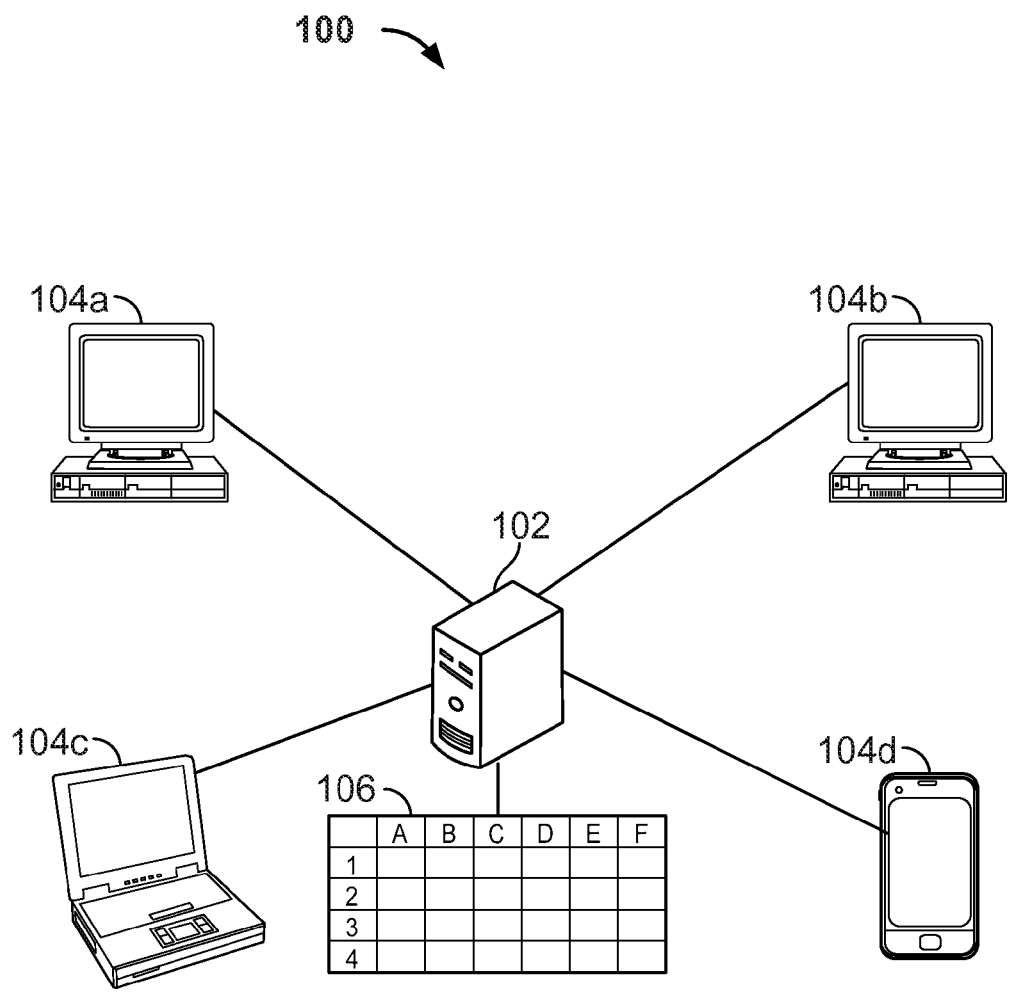
FIG. 1 shows a number of client computers in communication with a cloud computing service storing one or more spreadsheets in accordance with an implementation as described herein.

First, a client-server system in which a number of client computers may connect to a cloud computing service is described. FIG. 1 shows a client-server system 100 that includes cloud computing service 102 and a number of client computers 104a through 104d. Cloud computing service 102 may include one or more servers that collectively provide cloud computing services for a multitude of client computers. Cloud computing service 102 stores a number of files accessible by client computers 104a-104d, including collaborative spreadsheet 106. Users may create, edit, copy, share, and delete files stored on cloud computing service 102. For example, client computers 104a-104d may simultaneously access spreadsheet 106 on cloud computing service 102 using a web browser. Cloud computing service 102 provides each client computer with a local copy of spreadsheet 106, which users on the client computers may view and edit. Edits, otherwise termed mutations, made by client computer 104a are automatically sent to cloud computing service 102 and transmitted to the other client computers 104b-104d. Thus mutations made by one collaborator are immediately seen by other collaborators. Client computers 104a-104d may include desktop computers, laptop computers, tablets, smart phones, mobile electronic devices, or any other device that may connect to cloud computing service 102 through a remote network. System 100 may include many client computers that connect with cloud computing service 102. Cloud computing service 102 and client computers 104a-104d of system 100 are connected through a remote network, such as the Internet. The network connection may be facilitated through a local area network, wide area network, Ethernet, fiber optic network, or any other wired or wireless connection.

Figure 2:
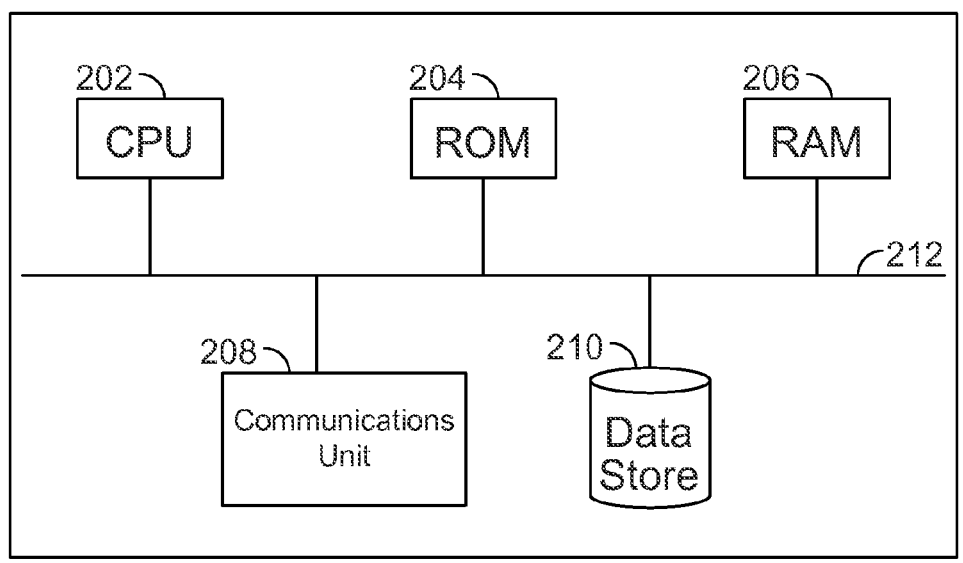
FIG. 2 shows a server implementing a cloud computing service in accordance with an implementation as described herein.

A server for providing a cloud computing service is now described in more detail. Server 200 in FIG. 2 shows an example of a server for use in a cloud computing service. A cloud computing service may include a number of servers that collectively provide the cloud computing service. Server 200 includes a central processing unit (CPU) 202, read only memory (ROM) 204, random access memory (RAM) 206, communications unit 208, data store 210, and bus 212. Server 200 may have additional components that are not illustrated in FIG. 2. Bus 212 allows the various components of server 200 to communicate with each other. Communications unit 208 allows server 200 to communicate with other devices, such as a number of client computers. Data store 210 may store, among other things, files that may be accessed, viewed, or edited by a number of client computers. These files may include word processing files, presentation files, spreadsheets, or multimedia files. Each file in data store 210 may be associated with an access control list (ACL), which determines the access rights of users attempting to view files in data store 210 (e.g. write access, read access, no access). Users connect with server 200 through communications unit 208 to access files stored in data store 210.

A client computer for accessing files stored on a cloud computing service is now described in more detail. Client computer 300 in FIG. 3 includes a central processing unit (CPU) 302, read only memory (ROM) 304, random access memory (RAM) 306, input/output interface 308, web browser 310, and bus 312. Client computer 300 may have additional components that are not illustrated in FIG. 3. Bus 312 allows the various components of client computer 300 to communicate with each other. Input/output interface 308 allows client computer 300 to communicate with other devices, such as a cloud computing service, and also includes devices for taking in user inputs and displaying outputs to a user. Web browser 310 is used, among other things, to provide a user interface to view and edit files stored on a cloud computing service. Web browser 310 also displays mutations made by other collaborators who may be editing the same file as the user of client computer 300. The cloud computing service may determine the layout of the user interface displayed on web browser 310 for accessing and viewing files.

Figure 3:
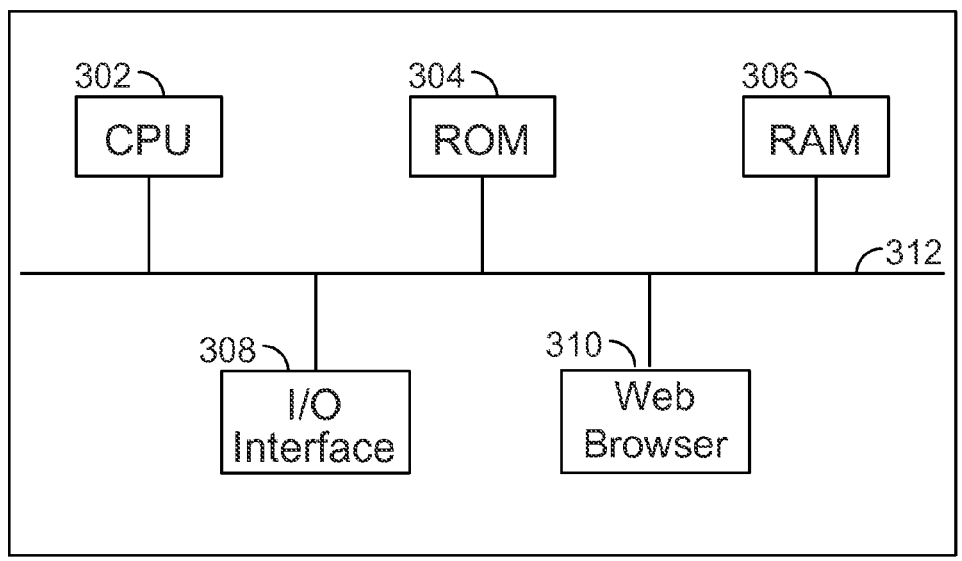
FIG. 3 shows a client computer for loading a spreadsheet stored on a cloud computing service in accordance with an implementation as described herein.

Data store 210 for files stored on cloud computing service 200 in FIG. 2, web browser 310 for client computer 300 in FIG. 3, and other data structures and software programs on cloud computing service 200 and client computer 300 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and readable, once-writable, or rewriteable CD-ROM and DVD-ROM disks.

The operation of a collaborative spreadsheet stored on a cloud computing service is now described. FIG. 4 shows a sheet 400 of a collaborative spreadsheet stored on a cloud computing service. A collaborative spreadsheet is a spreadsheet file that may be accessed and edited by more than one user simultaneously. A collaborative spreadsheet may contain one or more sheets, with each sheet containing a grid of cells. For example, sheet 400 contains data in several cells, with data of the same type listed in columns 402 and data associated with the same person arranged in rows 404. Sheet 400 may contain any amount of data arranged in any possible configuration and is not limited to the layout shown in FIG. 4. The data in sheet 400 may be entered by one or more users connecting to the cloud computing service using client computers, as shown in FIG. 1. Users may have write access to sheet 400, or may only have read access, in which the user may view but may not edit the data. An ACL associated with the collaborative spreadsheet may determine the access rights of users attempting to access the spreadsheet.

The cloud computing service may offer users a multitude of functions for creating, manipulating, and displaying data on a spreadsheet. One such function is called filtering. Filtering may encompass the sorting of data according to one or more criteria (e.g. alphabetically or numerically), and may encompass hiding certain data values, rows, or columns from the display. A filter may be stored as a data transformation model that maps or transforms the underlying data of the spreadsheet before displaying it (e.g. a transformation that assigns cell data to new cells for the purposes of displaying on a screen). FIG. 5 shows an example of a filtering menu for a sheet 500 of a collaborative spreadsheet stored on a cloud computing service. Sheet 500 includes column headers including "Age" and "Score." When a user turns the filter option on, each column may display a drop-down arrow 504. When a user selects the drop-down arrow, a filter menu 502 may be displayed for that column. For example, when the filter drop-down arrow is selected for the "Age" column, filter menu 502 appears and gives the user a number of ways to filter the data of sheet 502 using criteria applied to the "Age" column. Filter menu 502 includes sort functions 506, which may sort the rows of sheet 502 by a specific ordering. For example, if "Sort smallest->largest" is selected by the user, rows 1-6 may be sorted according to the numbers in the "Age" column so that the row with the smallest numerical age appears first and the row with the largest numerical age appears last. Filter menu 502 also allows users to hide data using data checkboxes 512. Data checkboxes 512 show all the recorded data values in the "Age" column. When a data value is unchecked, any row containing that data value is hidden from the display of sheet 500. Filter menu 502 may also provide shortcuts 508 to select all data values or to clear the selection of all data values from data checkboxes 512, and may provide a search box 510 to search for particular data values in the list of data checkboxes. Filter menu 502 may also provide "OK" and "Cancel" buttons to apply a filter or cancel the filter. Filtering may also be applied not just to columns, but to rows or selections of cells. A user highlights the cells, rows, or columns that the user wants to filter and then invokes the filter function. Filter menu 502 may include other data sorting and filtering options not shown in FIG. 5.

An example of a filtered sheet in a collaborative spreadsheet is shown in FIG. 6. For example, take sheet 400 of FIG. 4 to be the unfiltered sheet. A user selects the filter menu for the "Age" column and sorts the ages from smallest to largest, and unselects the data checkbox for data value "18." This filter will arrange the rows of sheet 400 according to age and hide any rows in which the age value is 18. Sheet 600 in FIG. 6 shows the result of applying this filter to unfiltered sheet 400. As can be seen, the rows of sheet 600 are arranged so that the smallest age is first and the largest age is last. Also, because the age value associated with the name "Tyrone" is 18, the entire row for the "Tyrone" entry is hidden from the display of sheet 600. Sheet 600 may indicate that rows have been hidden by a filter by omitting the row number of hidden rows in the row counter. For example, in FIG. 6 there is no row "5." The user may edit or cancel the filter on the "Age" column by selecting the filter drop-down arrow for that column. The user may also create another filter using the appropriate filter drop-down arrows.

Usually, when a user editing a collaborative spreadsheet stored on a cloud computing service applies a filter to a sheet, the filter is transmitted to the cloud computing service and any other collaborators who are also viewing the sheet. Thus only one filter may be applied to the sheet at any one moment, and multiple collaborators cannot apply filters independently of one another. This may be problematic if multiple collaborators wish to filter overlapping sets of data in different ways, as the sheet will only display the most recent filter. Also, cloud computing services do not offer users the ability to save multiple filters and allow multiple collaborators to select these saved filters independently.

The systems and methods of the present application provide collaborators with the ability to independently apply filters to sheets of a collaborative spreadsheet. For each filter in a collaborative spreadsheet, the cloud computing service stores a plurality of filters associated with that sheet. When a user on a client computer accesses a sheet of the collaborative spreadsheet, the cloud computing service provides the client computer with a local copy of the sheet and a copy of the plurality of filters associated with that sheet. Other collaborators who access the collaborative spreadsheet also receive local copies of the sheet and the filters. When the user selects a filter to apply to the sheet, the filter transforms the data on the local copy of the sheet and displays the filtered sheet to the user. The user's selection of the filter is not communicated to other collaborators, unlike normal mutations. Thus the filter is not automatically applied to the sheets displayed by the collaborator client computers. Each collaborator could independently apply different filters to the same sheet of a collaborative spreadsheet stored on a cloud computing service. The user's selection of a filter may be communicated with the cloud computing services, or may not be communicated at all.

Client computer may use web browsers to display collaborative spreadsheets stored on a cloud computing service. The cloud computing service provides a user interface (UI) to be displayed on the web browser. The UI allows the user to view and edit the sheets of a collaborative spreadsheet, as well as invoke spreadsheet functions such as filtering. FIG. 7 shows an example of a UI 700 for displaying a sheet of a collaborative spreadsheet. UI 700 shows a number of cells of data arranged in numbered rows and lettered columns. UI 700 includes a sidebar window 702 for applying filters to the sheet. Sidebar window 702 shows a list of filters that may be applied to the sheet. For example, filter 704 is a "No Filter" option, which when selected removes all filters from the display of the sheet. Filter 706, named "Over 20," may implement the filter described in relation to FIG. 6, i.e. the "Age" column is sorted from smallest to largest and any age value that equals 18 is removed from the display. Another filter 710 is named "Filter 2." Each filter may have a drop-down menu 708 that may be selected. Drop-down menu 708 includes filter commands to duplicate the filter, rename the filter, delete the filter, or make the selected filter the default filter. The filters 704, 706, or 708 may be marked with a symbol, such as a star, to denote which filter is the default filter. The current filter that the user is applying to the sheet may be highlighted or bolded to indicate which filter is active. There is also a filter command 712 to create a new filter. Selecting filter command 712 may generate a filter edit window, similar to filter menu 502 shown in FIG. 5, so that the user may define the filter. A user may create a filter without saving the filter, or may save and name the filter, in which case the filter will be added to the list of filter shown in sidebar window 702. Sidebar window 702 may include other filter commands not shown in FIG. 7. For example, drop-down menu 708 may have an option to make the filter private or public. If a filter is made private, no other collaborators may use the filter. UI 700 may also provide a separate sort function independent of the filter function. When a user sorts the sheet data using the sort function as opposed to the filter function, it may be treated as a mutation. Thus the sort command is sent to the cloud computing service and to the other collaborators so that their display of the data is automatically updated. If the user sorts the sheet data using the filter function, the command is not sent to other collaborators. In either option, when a cell value that is affected by the sort criteria is changed, the display of the sheet may be automatically updated to reflect the new order.

Sidebar window 702 may appear when the user selects a filter option from a menu on UI 700, or sidebar window 702 may be invoked when a user edits the filter. Sidebar window 702 may be open as long as there is an active filter applied to the sheet and disappears when there are no active filters on the sheet. Sidebar window 702 may fade away when the user does not use the sidebar window for a period of time, such as a period of time after the user stops editing a filter. Sidebar window 702 may be minimized, toggled, or closed by the user, or the user may move the location of sidebar window 702 within UI 700. Closing sidebar window 702 may remove all active filters from the display of the sheet. Alternatively, sidebar window 702 may remain open and may only disappear when the user deactivates all filters (i.e. selects the "No Filter" option). Sidebar window 702 may only appear when the user selects a cell affected by a filter or edits a filter. There may be other actions by the user that may cause sidebar window 702 to appear or disappear from UI 700. UI 700 may provide a help link with an explanation of how sidebar window 702 operates. UI 700 may be implemented using any known web browser programming language, including HTML and JavaScript.

A filter model may be stored on the cloud computing service and client computers as a data structure with several defined attributes. For example, a filter model may include a unique identifier for the filter (such as a string of alphanumeric characters) and a name that is given to the filter by a user. The filter model includes a range of cells over which the filter applies. The filter model may also include a list of the sorted row order, where the rows of the unfiltered sheet are mapped to the rows of the filtered sheet according to the filter criteria. The filter model may also include a Boolean list of hidden rows, which indicates whether certain rows will be hidden from view or remain visible. The filter model may also include a list of excluded data which track the user's selection of checkboxes 512 in FIG. 5. The filter model may also include identification of the user who created or last modified the filter. Other information not listed may also be included in the filter model. Each filter has an associated data structure, and this data structure is sent from the cloud computing service to the client computer when loading a sheet of the collaborative spreadsheet. Edits to the filter change the data structure and are communicated to the cloud computing service and other collaborators.

User actions inputted to sidebar window 702 may be communicated with the cloud computing service. For example, if the user creates or duplicates a new filter for a sheet, the client computer may create the filter model and send it to the cloud computing service for storage as a filter associated with the sheet. If the user deletes a filter associated with a sheet, the client computer may send a request to the cloud computing service to delete the corresponding master copy of the filter. If the user edits or renames a filter, the client computer changes the filter model that it stores and sends the edited filter model to the cloud computing service, which will then update the master copy of the filter model. If the user sets a filter as a default filter, then the client computer may send a request to the cloud computing service to set the master copy of that filter as the default filter. Any subsequent collaborator who accesses the sheet from the cloud computing service will receive a copy of the unfiltered sheet and the default filter will be automatically applied. If the user has write access to the spreadsheet (determined, for example, by an ACL), then the user may create, edit, or delete filters. If the user only has read access to the spreadsheet, the cloud computing service may allow the user to use filters but may not allow the user to create, edit, or delete filters. The creation, editing, or deletion of filters by a user may be sent to the cloud computing service and the other collaborators currently accessing the spreadsheet. So although the use of a filter to rearrange data is not communicated to collaborators, changes to the filters themselves are communicated to the collaborators.

Figure 8:
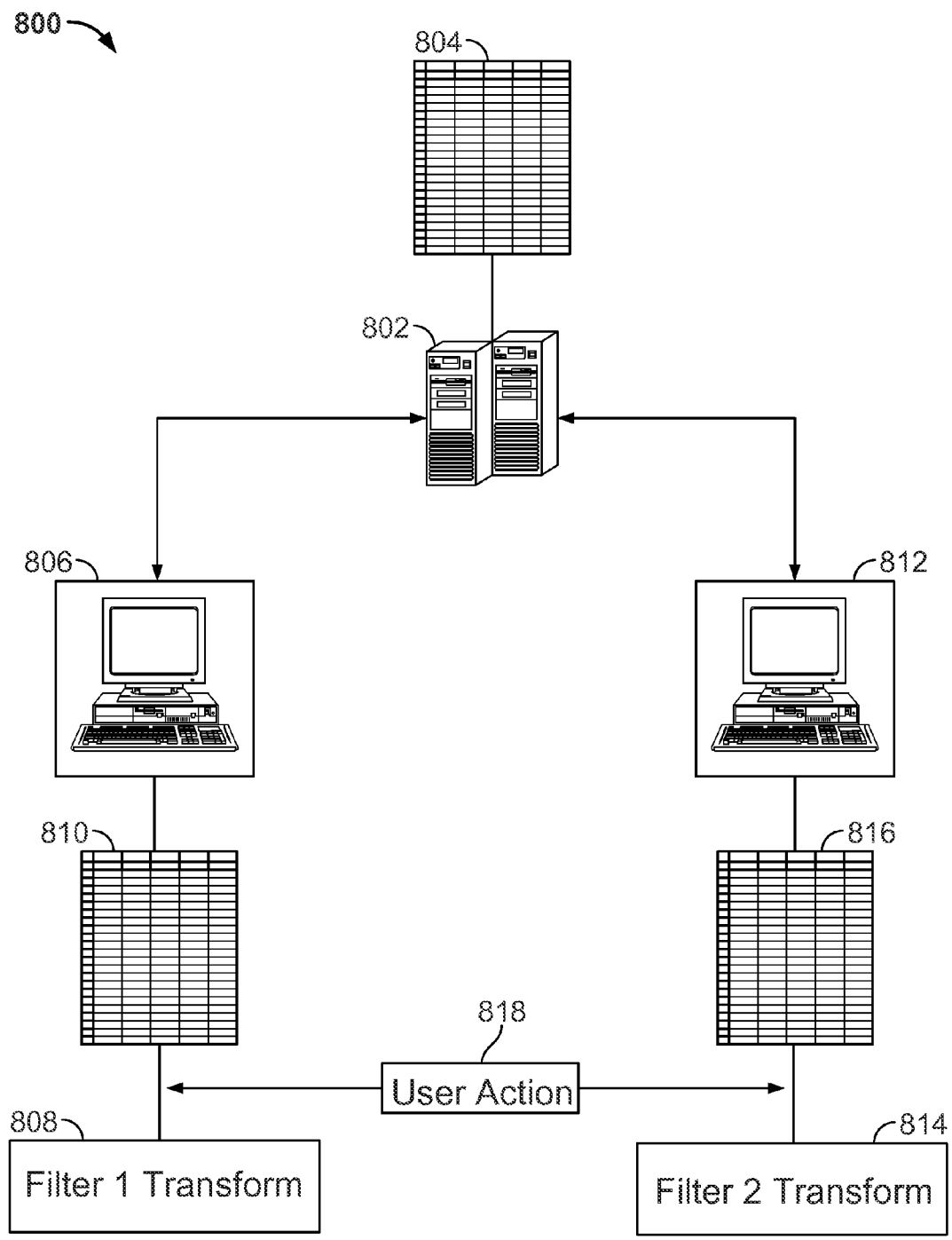
FIG. 8 shows a diagram for processing collaborator mutations for a collaborative spreadsheet stored on a cloud computing service in accordance with an implementation as described herein.

When a filter is applied to a sheet of a collaborative spreadsheet, cells may be referenced into two ways—either to the unfiltered sheet or to the filtered sheet. For example, in UI 700 with the "Over 20" filter applied, the name entry "Nick" appears in cell A4 when referencing the filtered sheet. However, when referencing the unfiltered sheet shown in FIG. 4, the name "Nick" is actually in cell A2. A filter may be considered a mapping, or transformation, between the cells of the unfiltered sheet and the cells of the filtered sheet. The filtered sheet is generated by applying the filter to the unfiltered sheet, and the filtered sheet is displayed by the client computer. When a user inputs an edit, or mutation, on the sheet, the mutation may be in reference to the cells of the unfiltered sheet or may be in reference to the cells of the filtered sheet. In addition, user presence information may be sent to other collaborators. For example, if a user highlights cells A1-A5, the user interface on collaborator client computers may display that the user has highlighted those cells. Mutations and user presence information may collectively be termed user actions. FIG. 8 shows a system for processing user actions for a collaborative spreadsheet where user inputs are made in reference to the unfiltered sheet. System 800 includes a cloud computing service 802 storing a master copy of collaborative spreadsheet 804. Collaborative spreadsheet 804 may include one or more sheets, and each sheet may be associated with one or more filters. Two client computers, 806 and 812, connect to cloud computing service 802 to access collaborative spreadsheet 804. When each client computer accesses the collaborative spreadsheet, a local copy of the collaborative spreadsheet 804 is loaded onto each client computer, shown as local copies 810 and 816. The local copies include a copy of at least one sheet and the associated filters for that sheet.

The user on client computer 806 applies a filter 808, named "Filter 1" to its local copy 810 of the collaborative spreadsheet. The filter transforms the cells of the unfiltered sheet and rearranges the cells for display to the user. Likewise, a user on client computer 812 selects "Filter 2", shown as filter transform 814, to apply to its local copy 816 of the collaborative spreadsheet. The selection of filters by each client computer is not communicated to the other client computer and thus each user's selection of a filter is not affected by the other user. Client computers 806 and 812 may send filter selection information to cloud computing service 802. The users on the client computers take user actions to local copies 810 and 816. User actions are processed by the client computers and by cloud computing service 802 depending on whether the user actions reference the unfiltered sheet or the filtered sheet.

FIG. 8 shows an example of user action processing of a filtered spreadsheet when user actions are referenced to the unfiltered sheet. In such a scenario, local copies 810 and 816 stored on the client computers always store the unfiltered copy of sheets regardless of any filters 808 or 814 that a user may apply to the sheet. The user initiates user action 818 which references the cells of the unfiltered sheet. Only when the sheet is displayed to the user are filters 808 and 814 applied to the unfiltered local copies 810 and 816. For example, let a filter rearrange the data in cell A1 of a sheet to cell D5. When a user applies the filter to the sheet, the filter does not alter the underlying local copy of the sheet stored on the client computer. Rather, the client computer calculates a filtered version of the sheet from the unfiltered local copy and displays the filtered sheet. This filtered sheet is stored in temporary memory and may be recalculated whenever the sheet is refreshed on the display screen. Thus although the client computer screen displays the data in cell D5, the local copy of the sheet stores the data in cell A1. When a user inputs a user action, it is stored in reference to the unfiltered local copy of the sheet. For example, when the user edits what the user sees as cell D5 on the display, the client computer actually mutates cell A1 in its local copy, not cell D5. Only when the display of the sheet is next refreshed does the client computer apply the filter to the local copy and display the mutation in cell D5. Because the user actions are stored in reference to the unfiltered sheet, the user actions can be sent directly to the cloud computing service and collaborator client computers without any transformations. The cloud computing service records user actions in its master copy of the sheet and sends the user actions to all other collaborators currently accessing the sheet. At the collaborator client computer, the user action is applied to the unfiltered local copy stored on that client computer. If the collaborator has applied a filter to the local copy, the user actions are transformed through the filter before being displayed on the screen of the collaborator client computer. For example, the collaborator may receive the mutation to cell A1 and update cell A1 of the local copy on the collaborator client computer. If the collaborator uses a filter that transforms the data in cell A1 to cell B3, the mutation is transformed through the filter and cell B3 on the collaborator computer screen is updated.

Collaborative spreadsheets may have a calculation engine that calculates cell values. This engine is separate from the UI engine that displays the sheet to the user. Calculations and formulae are affected when user actions reference the unfiltered sheet and the sheet is only filtered when displayed. Calculations and formulae may use data found in one or more cells that are rearranged by the filter. When a formula or calculation is displayed on the screen, it may reference cells of the unfiltered sheet while the sheet itself has been rearranged. This may be confusing for a user to view. To solve this problem, the filter may also be applied to cell references in calculations and formulae. Thus when calculations and formulae are displayed on screen, they reference the cells of the filtered sheet while the actual calculations or formulae stored in memory reference cells of the unfiltered sheet. The client computer may also restrict the user's ability create new formulae. For example, if a user highlights a contiguous set of cells in the filtered view of the sheet to use in a formula, the set of cells may not actually be contiguous in the unfiltered view. The client computer may disallow such an action.

Figure 9:
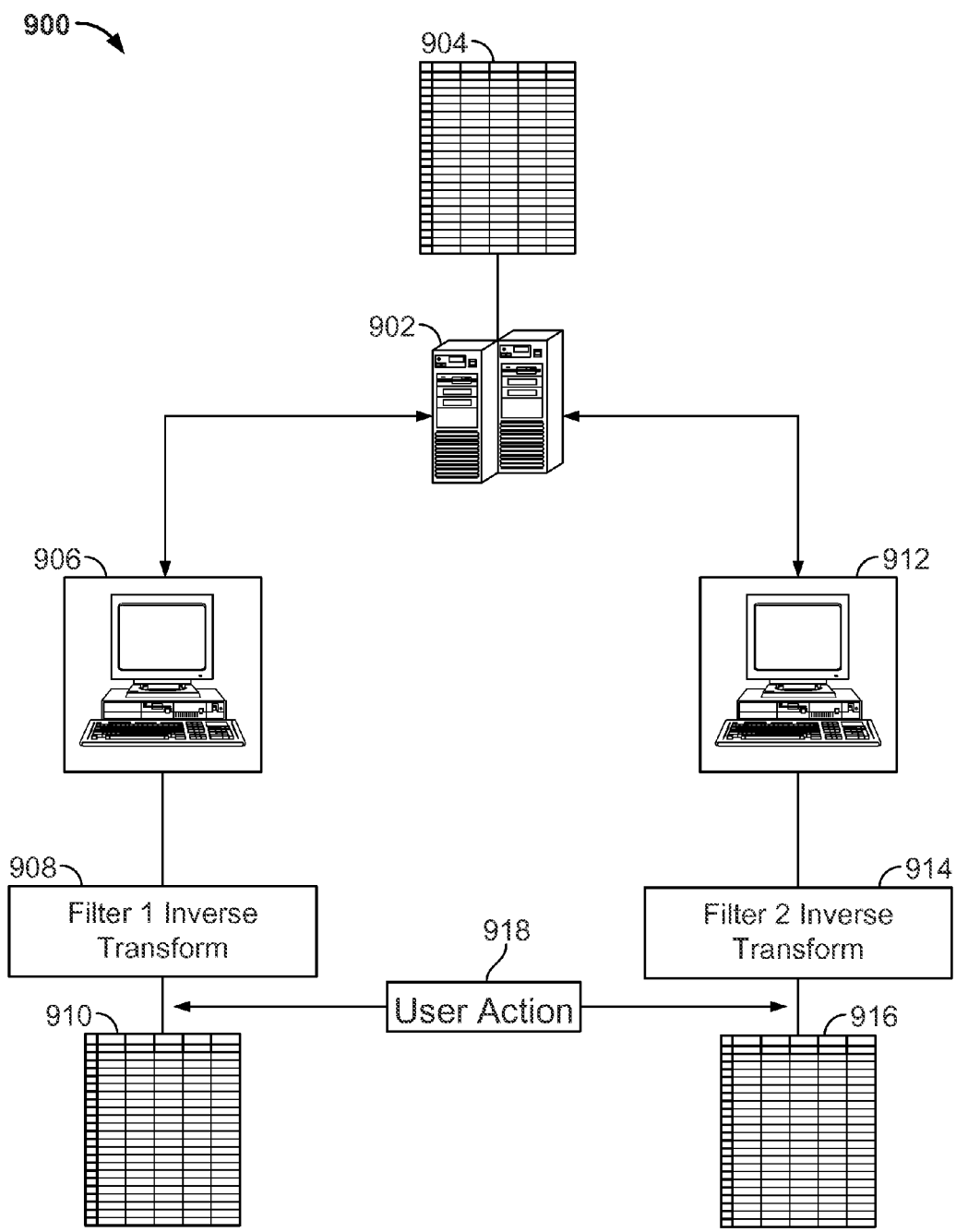
FIG. 9 shows another diagram for processing collaborator mutations for a collaborative spreadsheet stored on a cloud computing service in accordance with an implementation as described herein.

In an alternate design, user actions may reference the cells of the filtered sheet on a client computer. FIG. 9 shows an example of mutation processing of a filtered spreadsheet when user actions are referenced to the filtered sheet. System 900 includes a cloud computing service 902 storing a master copy of collaborative spreadsheet 904. Collaborative spreadsheet 904 may include one or more sheets, and each sheet may be associated with one or more filters. Two client computers, 906 and 912, connect to cloud computing service 902 to access collaborative spreadsheet 904. When each client computer accesses the collaborative spreadsheet, a local copy of the collaborative spreadsheet 904 is loaded onto each client computer, shown as local copies 910 and 916. The local copies include a copy of at least one sheet and the associated filters for that sheet. The user on client computer 906 applies "Filter 1" to its local copy 910 of the collaborative spreadsheet. Likewise, a user on client computer 912 applies "Filter 2" to its local copy 916 of the collaborative spreadsheet.

In FIG. 9, local copies 910 and 916 stored on the client computers are updated whenever a user selects or changes a filter. Thus, unlike the situation in relation in FIG. 8, filters change the local copy of the sheets, which are then directly displayed to the user. User mutations 918 to the sheet reference the cells of the filtered sheet. Thus when a user action is received by a client computer, the user action is applied to the filtered local copy of the sheet and displayed directly to the user. However, before user actions are sent to the cloud computing service, the user actions are transformed by the inverse of the filter so that the user actions reference the unfiltered sheet. When the user on client computer 906 applies Filter 1 to the sheet, client computer 906 determines and stores the inverse of "Filter 1" 908 which maps the cells of the filtered sheet to the cells of the unfiltered sheet. Likewise, client computer 912 determines and stores the inverse of "Filter 2" 914. For example, a user mutation references cell D5 of the filtered local copy stored on a client computer, where the data in cell D5 corresponds to the data in cell A1 of the unfiltered sheet. Before the mutation is sent to the cloud computing service, the mutation is transformed against the inverse of the filter so that the transformed mutation references cell A1. This user action is sent to the cloud computing services for recordation in the unfiltered master copy of the sheet. The cloud computing service also sends the user action to other collaborators who are currently accessing the sheet. At the collaborator client computer, the user action is transformed through any filters used by the collaborator and then saved to the local copy on that client computer. For example, if the collaborator uses a filter that transforms the data in cell A1 to cell B3, then the mutation is transformed through the filter and stored in cell B3 of the local copy of the sheet on the collaborator client computer. Formulae and calculations may also be transformed in the same manner as user actions so that cell references make logical sense to each collaborator.

In another alternate design, the client computing service may track the filters that each collaborator is currently using. As in FIG. 9, the local copies of sheets may be altered by filters and user actions are stored in reference to the filtered sheet. The client computers may send the user actions directly to the cloud computing service, which performs the inverse filter transformation to obtain user actions referencing the unfiltered sheet. The cloud computing service may also transform user actions by filters used by collaborators before sending the user action to the collaborator client computers. Thus in contrast to the situation described in FIG. 9, the computation of the filter transformation and inverse transformation is done on the cloud computing service rather than the client computers. By tracking which filters collaborators are using, the cloud computing service may also allow some collaborators to mirror each other's filters while allowing other collaborators to use filters independently. For example, if user A and user B choose to mirror each other, any application of a filter by user A automatically updates the view of the sheet for user B. Another user, C, chooses to work independently and so user C's view of the sheet is not affected by user A's choice of filter.

Figure 10:
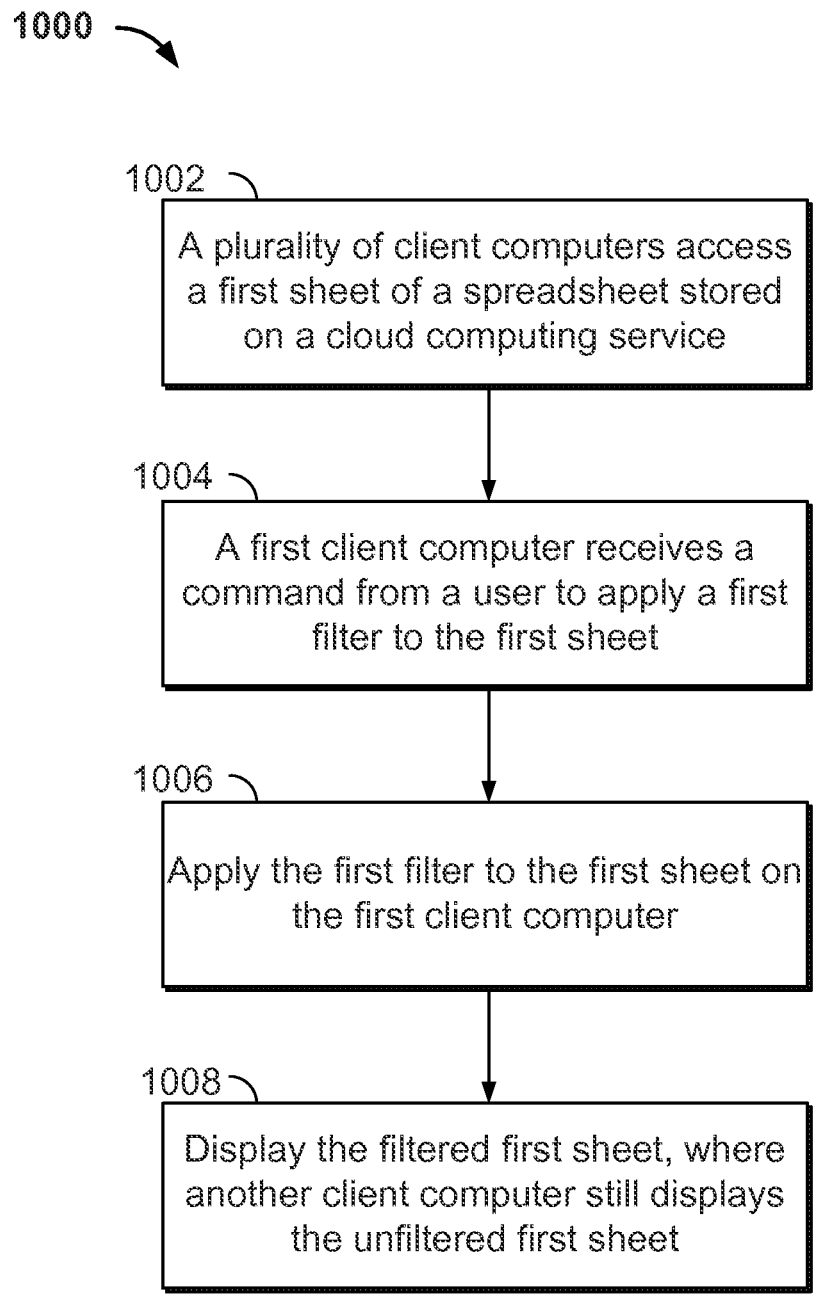
FIG. 10 shows a method for viewing filters on a collaborative spreadsheet stored on a cloud computing service in accordance with an implementation as described herein.

Various methods for creating, storing, and displaying filters for collaborative spreadsheets stored on a cloud computing service are now described. One method, shown in FIG. 10, provides a way to view filters on a collaborative spreadsheet stored on a cloud computing service. Method 1000 includes accessing, from each of a plurality of client computers, a first sheet of a spreadsheet stored on a cloud computing service, where a plurality of filters is associated with the first sheet. The method further includes receiving at a first client computer in the plurality of client computers a command by a first user to apply a first filter in the plurality of filters to the first sheet. The method further includes applying the first filter to the first sheet on the first client computer, and displaying the filtered first sheet to the first user, where a second client computer in the plurality of client computers concurrently displays an unfiltered first sheet. Method 1000 may be performed on any type of client computer that may connect to a cloud computing service, such as the client computer described in FIG. 3 or any desktop computer, laptop computer, tablet, smartphone, or such electronic device.

Method 1000 begins when a plurality of client computers access a first sheet of a collaborative spreadsheet stored on a cloud computing service, illustrated at 1002. The master copy of the spreadsheet stored on the cloud computing service contains one or more sheets, where at least one sheet is associated with a plurality of filters. Filters, as described above, rearrange the display of data on the sheet for the user, and may include sorting data and removing certain data values from view. Filters may be defined by users and stored on the cloud computing service. The cloud computing service allows users on the plurality of client computers concurrent access to the first sheet, such as illustrated in FIG. 1. The spreadsheet may have an ACL that determines which users may access the spreadsheet, and each user's access level. When a user on a client computer accesses the first sheet, the cloud computing service sends a copy of the first sheet and the associated filters to the client computer. This copy is stored as a local copy on the client computer and is displayed to the user, for example through a web browser. A user interface on the web browser allows the user to view and edit the sheet. Edits, or mutations, made by the user are recorded in the local copy of the sheet and sent to the cloud computing service for recordation in the master copy.

After local copies of the first sheet are loaded onto each client computer, the client computer receives a command from a user to apply a filter to apply to the first sheet, illustrated at 1004. The cloud computing service provides the client computer with a user interface to view and edit the first sheet, such as the user interface shown in FIG. 7. The user interface includes a menu or sidebar window for a user to select a filter to apply to a group of cells in the first sheet. The user highlights the group of cells that the user desires to filter, and selects a filter from the plurality of filters associated with the first sheet. The client computer then applies the selected filter to the first sheet, illustrated at 1006. The filter transforms the cell data stored in the local copy of the first sheet, as described previously in this application. If the user has previously applied another filter to the first sheet, the selection of a new filter causes the client computer to remove the previous filter and apply the new filter to the first sheet.

After the client computer applies the selected filter to the first sheet, the filtered first sheet is displayed to the user of the client computer, illustrated at 1008. A user selection of a filter on one client computer is not communicated to other client computers that are concurrently accessing the same sheet. Thus although a user on one client computer may apply a filter to the first sheet, a second client computer still displays the unfiltered sheet, or perhaps a sheet that is filtered based on the selection of another filter by a user on the second client computer. The user selection of a filter may be communicated to the cloud computing service, which may store what filters each user is currently using. The cloud computing service, however, does not alter the master copy of the first sheet and does not send filter selection information to other client computers. In this manner, method 1000 provides multiple concurrent collaborators with the ability to independently utilize filters on collaborative spreadsheets stored on a cloud computing service.

Figure 11:
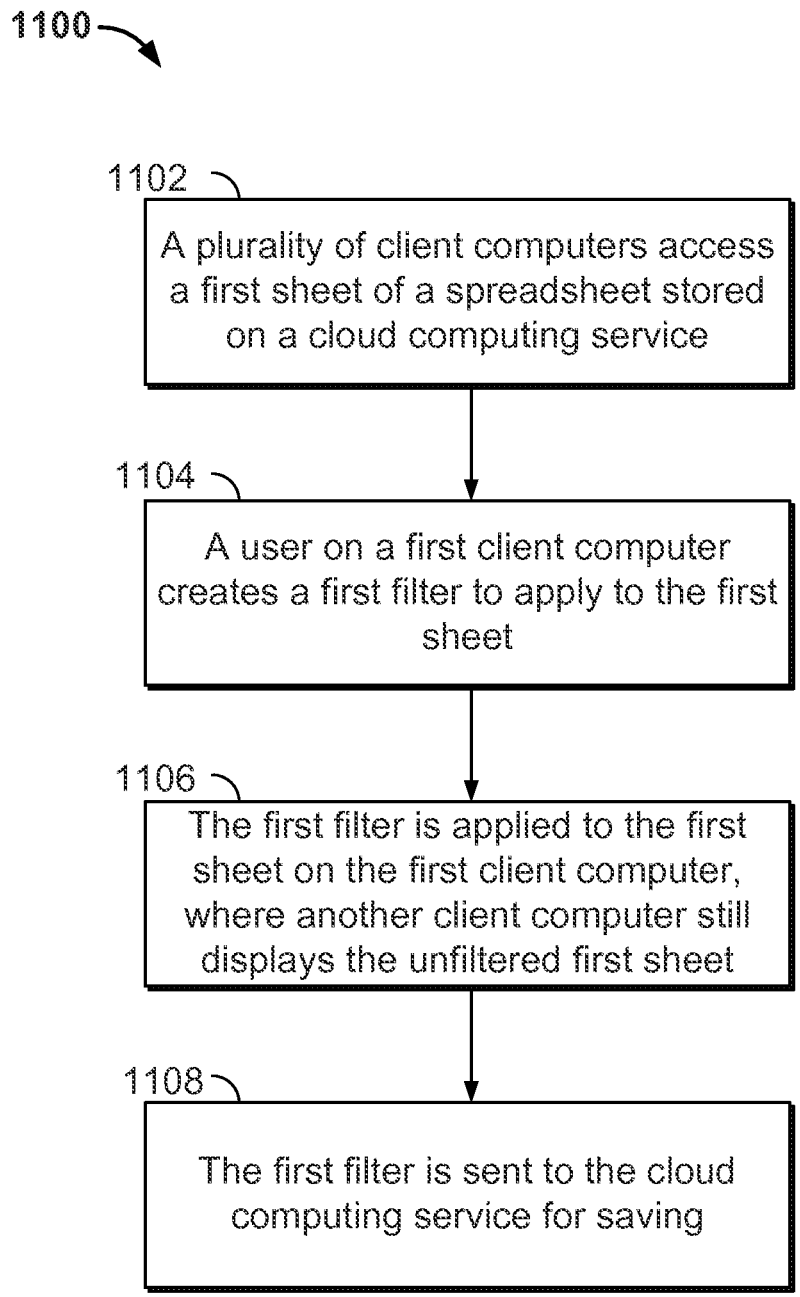
FIG. 11 shows a method for creating filters for collaborative spreadsheets stored on a cloud computing service in accordance with an implementation as described herein.

Another method described herein provides a way to create filters for collaborative spreadsheets stored on a cloud computing service. Method 1100 in FIG. 11 includes accessing, from each of a plurality of client computers, a first sheet of a spreadsheet stored on a cloud computing service. The method further includes creating a first filter on a first client computer in the plurality of client computers, where a user on the first client computer defines the first filter. The method further includes applying the first filter to the first sheet on the first client computer, where a second client computer in the plurality of client computers concurrently displays an unfiltered first sheet, and sending the first filter to the cloud computing service to be stored and associated with the first sheet. Method 1100 may be performed on any type of client computer that may connect to a cloud computing service, such as the client computer described in FIG. 3 or any desktop computer, laptop computer, tablet, smartphone, or such electronic device.

Method 1100 begins when a plurality of client computers access a first sheet of a collaborative spreadsheet stored on a cloud computing service, illustrated at 1102. The master copy of the spreadsheet stored on the cloud computing service contains one or more sheets. One or more filters may be associated with each sheet. The cloud computing service allows users on the plurality of client computers concurrent access to the first sheet, such as illustrated in FIG. 1. The spreadsheet may have an ACL that determines which users may access the spreadsheet, and each user's access level. When a user on a client computer accesses the first sheet, the cloud computing service sends a copy of the first sheet and the associated filters to the client computer. This copy is stored as a local copy on the client computer and is displayed to the user, for example through a web browser. A user interface on the web browser allows the user to view and edit the sheet. Edits, or mutations, made by the user are recorded in the local copy of the sheet and sent to the cloud computing service for recordation in the master copy.

After a local copy of the first sheet is loaded on the client computers, a user on a first client computer creates a first filter for the first sheet, illustrated at 1104. The ability to create or edit filters for the spreadsheet may be limited by the ACL of the spreadsheet. For example, users with write access may create or edit a filter for the sheet while users with read access may use filters but may not create or edit them. Filters, as described above, rearrange the display of data on the sheet for the user, and may include sorting data and removing certain data values from view. The cloud computing service provides the client computer with a user interface to create and edit filters for the first sheet, such as the user interfaces shown in FIGS. 5 and 7. This user interface may be displayed on a web browser executing on the client computer. For example, the user interface may include a menu or sidebar window for a user to create or edit a filter and apply it to a group of cells in the first sheet, such as the sidebar window shown in FIG. 7. When a user selects the option to create or edit a filter, a menu similar to menu 502 in FIG. 5 may appear. In this menu, the user defines the filter, such as defining a sort order or selecting certain data values to be displayed or removed from display.

After the user creates or edits the filter, the filter is applied to the first sheet of the client computer, illustrated at 1106. The filter transforms the cell data stored in the local copy of the first sheet, as described previously in this application. The filtered sheet is then displayed to the user. The created or edited filter is also sent to the cloud computing service, where the filter is stored and associated with the first sheet. The first sheet may also have other filters associated with it. Each user with appropriate access to the spreadsheet may create, edit, delete, rename, or duplicate the filters. When a filter is created or edited by a user, the cloud computing service may send the created or updated filter to the other client computers currently accessing the first sheet so that other users may use the filters. When a filter is deleted by a user, the cloud computing service deletes the master copy of the filter and instructs the other client computers to delete their copies of the filter as well. In this manner, method 1100 provides multiple concurrent collaborators with the ability to create or edit filters on collaborative spreadsheets stored on a cloud computing service.

Figure 12:
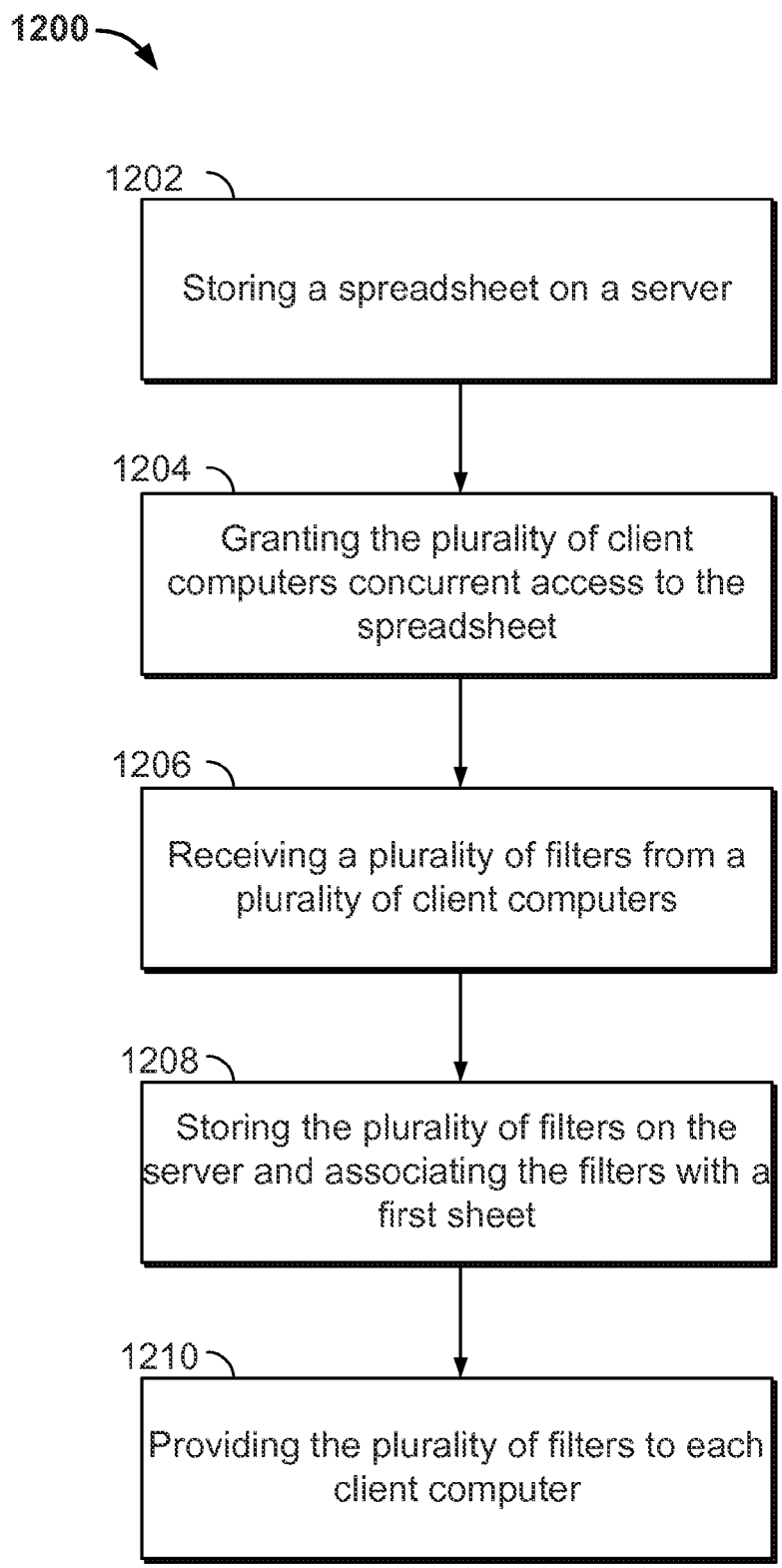
FIG. 12 shows a method for providing filters for collaborative spreadsheets stored on a server in accordance with an implementation as described herein.

Another method described herein discloses a way to provide filters for collaborative spreadsheets stored on a server hosting a cloud computing service. Method 1200 in FIG. 12 includes storing a spreadsheet on a server, where the spreadsheet comprises a plurality of sheets, and granting a plurality of client computers concurrent access to the spreadsheet. The method further includes receiving from the plurality of client computers a plurality of filters to be applied to a first sheet in the plurality of sheets, and storing the plurality of filters on the server, where the plurality of filters is associated with the first sheet. The method further includes providing the plurality of filters to each client computer in the plurality of client computers, where when a user on a first client computer in the plurality of client computers applies a first filter in the plurality of filters to the first sheet, the display of the first sheet on a second client computer in the plurality of client computers is independent of the filter application on the first client computer. Method 1200 may be performed on a server that hosts a cloud computing service, such as the server described in FIG. 2.

Method 1200 begins when a spreadsheet is stored on a server hosting a cloud computing service, illustrated at 1202. The spreadsheet has one or more sheets, where each sheet is composed of a number of cells arranged in columns and rows. Users on client computers connect to the server to access the spreadsheet, such as illustrated in FIG. 1. The server provides a user interface for users to view and edit sheets of the spreadsheet, such as a user interface displayed on a web browser executing on each client computer. Examples of user interfaces for spreadsheets are shown in FIGS. 4-7. The spreadsheet may have been created by a user on a client computer and saved on the server. The spreadsheet is collaborative, meaning that more than one user may edit the spreadsheet at the same time. The spreadsheet may be associated with an access control list, which determines each user's level of access to the spreadsheet.

After the spreadsheet is stored on the server, the server grants one or more client computers concurrent access to the spreadsheet, illustrated at 1204. The users on the client computers may concurrently collaborate and edit the spreadsheet. When a client computer connects to the server and requests access to the spreadsheet, the server may check whether the user is in the ACL of the spreadsheet. If the user is an authorized user, the server provides a copy of the spreadsheet to the client computer. The client computer stores this copy as a local copy on the client computer and displays it within a web browser. Thus each client computer possesses a local copy of the spreadsheet, while the server maintains a master copy. Mutations made by one user are propagated to the server and to the other users so that all collaborators have up-to-date copies of the spreadsheet.

After the client computers have been granted access to the spreadsheet, the server receives from one or more client computers a plurality of filters to be applied to a first sheet of the spreadsheet, illustrated at 1206. The filters are created by users on the client computers using the user interface provided by the server. For example, a user may select the "Create New Filter" option 712 provided in sidebar window 702 shown in FIG. 7. The user then defines the filter using a filter menu similar to menu 502 shown in FIG. 5. The filter may include commands to sort certain cells or hide certain cell values from view. Once the user defines the filter, it is saved on the client computer and sent to the server. The user may also edit a filter, rename a filter, duplicate a filter, set a filter to be the default filter, or delete a filter using the user interface. The access control list may determine which users may create, edit, or delete filters for the spreadsheet. The server receives the filters created by various users and stores them, illustrated at 1208. The server associates the filters with the first sheet. If a user has edited or renamed a filter, the server saves the updated filter in place of the old filter. If a user has deleted a filter, the server deletes its copy of the filter. If a user sets a filter to be the default filter, the server may set a flag for its copy of the filter.

After a number of filters for the first sheet have been created and stored on the server, the server provides the up-to-date plurality of filters to each client computer, illustrated at 1210. The server sends any new filters, changes made by a user to a filter, or commands to delete filters to each client computer so that all collaborators have an up-to-date list of filters available for the first sheet. Because each client computer maintains separate local copies of the first sheet, users may independently apply filters to their local copies of the first sheet without affecting the display of the first sheet on other client computers. The application of the filter is not treated the same as mutations, which are automatically passed to other collaborators. A user's selection of a filter may be communicated to the server, but the selection is not communicated to collaborator client computers. For example, two users could apply two different filters to the same set of data and not interfere with one another, or one user may apply a filter but another user may still view the unfiltered version of the first sheet. The server may provide users with an option to mirror each other's filter selections. For example, if user A and user B choose to mirror each other, any application of a filter by user A automatically updates the view of the sheet for user B. Another user, C, chooses to work independently and so user C's view of the sheet is not affected by user A's choice of filter. In this manner, method 1200 provides a way for a server hosting a cloud computing service to provide filters for collaborative spreadsheets.

Figure 13:
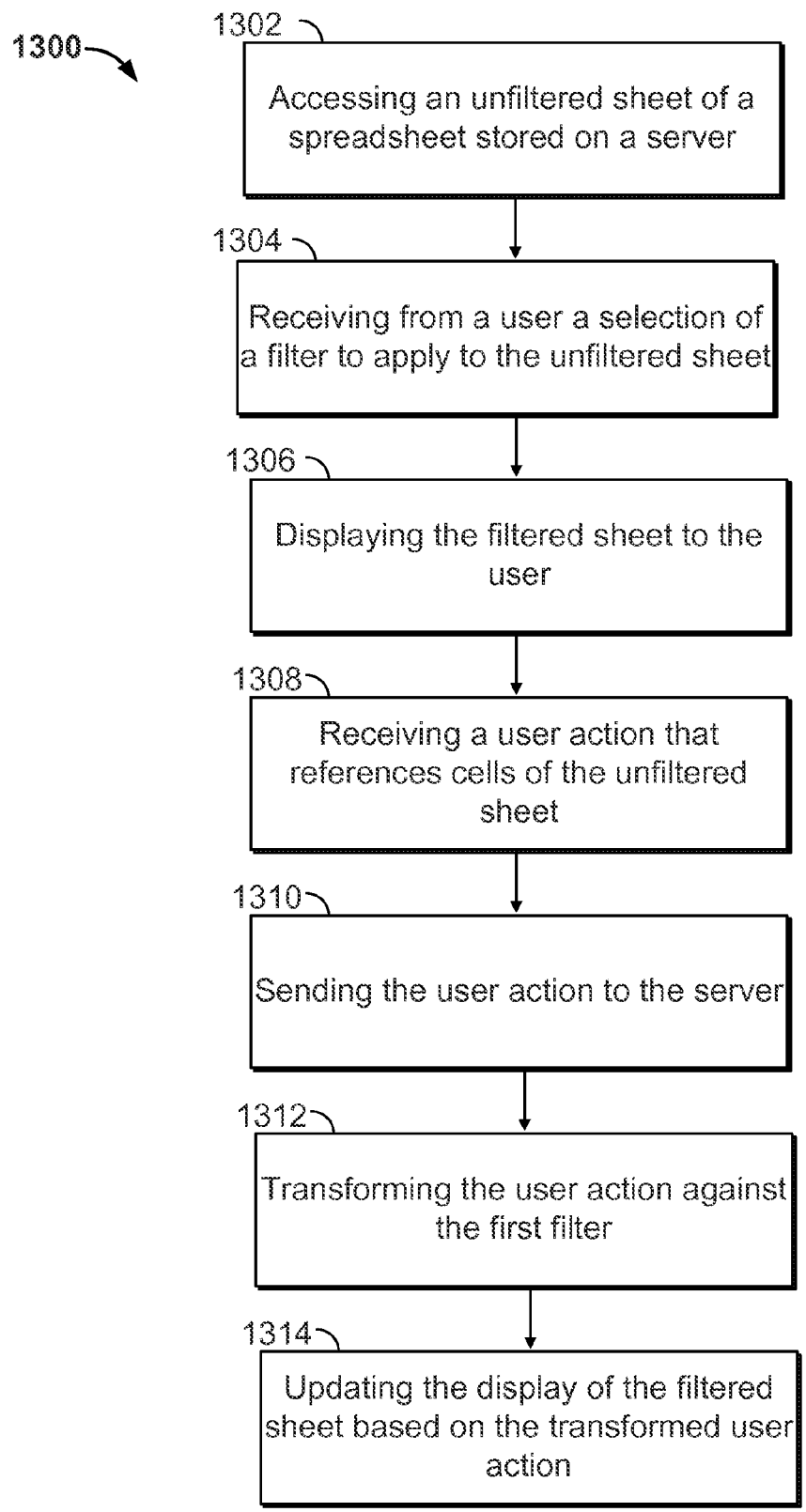
FIG. 13 shows a method for processing user actions on a collaborative spreadsheet in accordance with an implementation as described herein.

Another method described herein discloses a way to process user actions on a collaborative spreadsheet when user actions reference unfiltered sheets. Method 1300 shown in FIG. 13 includes accessing an unfiltered sheet of a spreadsheet stored on a server to display on a client computer, where a plurality of filters is associated with the unfiltered sheet. The method further includes receiving a selection by a user of a first filter in the plurality of filters to be applied to the unfiltered sheet, and displaying a filtered sheet to the user, where the filtered sheet is obtained by applying the first filter to the unfiltered sheet. The method further includes receiving a user action inputted by a user on the client computer, where the user action references cells of the unfiltered sheet, sending the user action to the server, transforming the user action against the first filter, and updating the display of the filtered sheet based on the transformed user action. Method 1300 may be performed on any type of client computer that may connect to a cloud computing service, such as the client computer described in FIG. 3 or any desktop computer, laptop computer, tablet, smartphone, or such electronic device.

Method 1300 begins when a client computer accesses an unfiltered sheet of a spreadsheet stored on a server hosting a cloud computing service, illustrated at 1302. The master copy of the spreadsheet stored on the server contains one or more sheets. One or more filters may be associated with each sheet. The server allows multiple users on client computers concurrent access to the first sheet, as illustrated in FIG. 1. The spreadsheet may have an ACL that determines which users may access the spreadsheet, and each user's access level. When a user on a client computer accesses the first sheet, the cloud computing service sends a copy of the first sheet and the associated filters to the client computer. This copy is stored as a local copy on the client computer and is displayed to the user, for example through a web browser. A user interface on the web browser allows the user to view and edit the sheet, such as the user interfaces shown in FIGS. 4-7.

After the client computer accesses the unfiltered sheet from the server, the client computer receives a selection of a first filter to be applied to the unfiltered sheet, illustrated at 1304. The user interface may include a sidebar window, such as illustrated in FIG. 7, from which the user may select a filter to apply to a segment of data in the unfiltered sheet. The client computer then applies the first filter to the unfiltered sheet and displays the resultant filtered sheet, illustrated at 1306. The first filter is a mapping, or a transformation, between the cells of the unfiltered sheet and the cells of the filtered sheet. For example, the first filter may map cell A1 of the unfiltered sheet to cell B2 of the filtered sheet such then when the first filter is applied, the display of cell B2 displays the data value of cell A1. The local copy of the unfiltered sheet stored on the client computer is unaffected by the user's selection of the first filter. That is, the client computer does not overwrite the unfiltered sheet with the filtered sheet in memory. Rather, the filtered sheet is temporarily stored and displayed on the display screen of the client computer.

Figure 14:
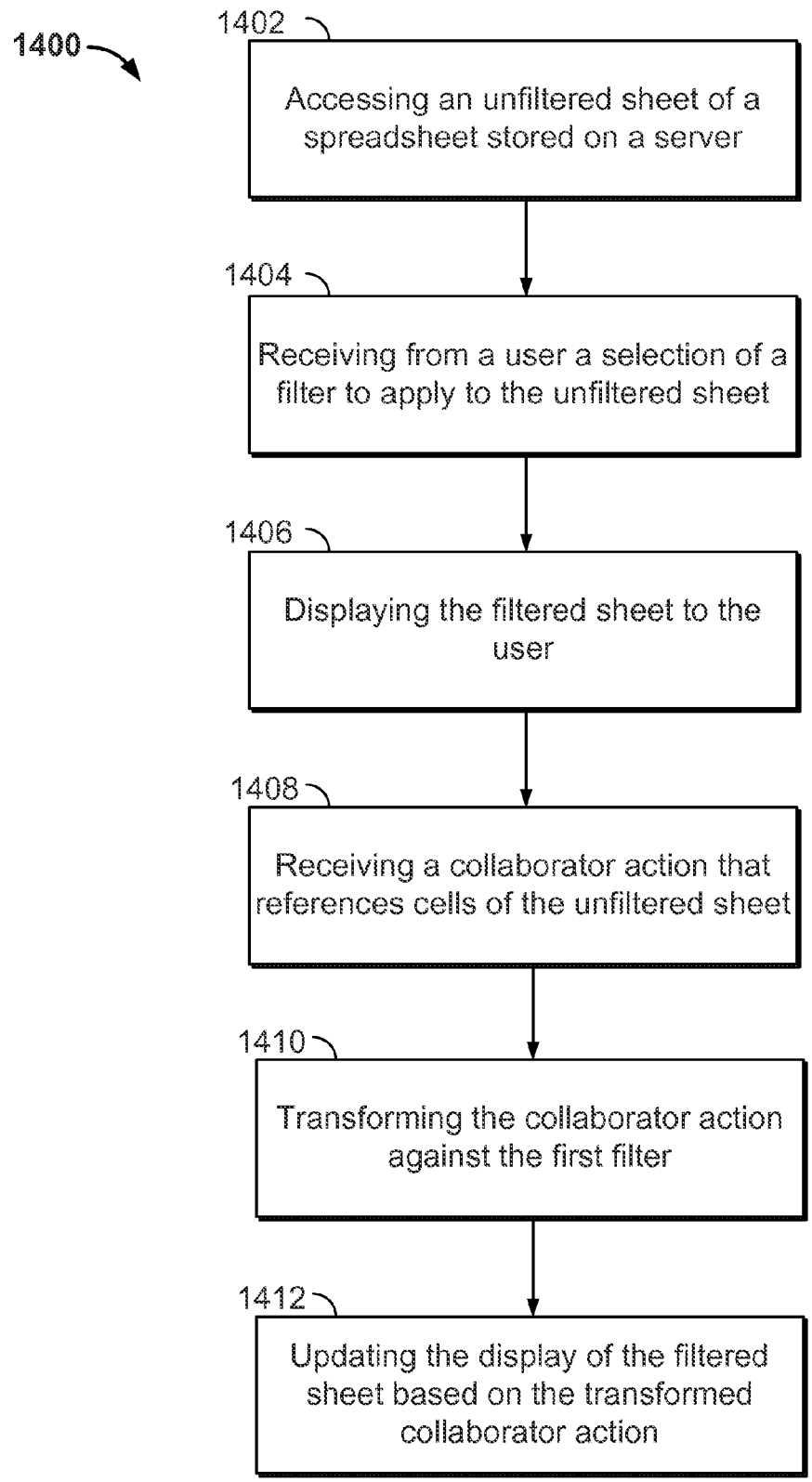
FIG. 14 shows a method for receiving collaborator actions on a collaborative spreadsheet in accordance with an implementation as described herein.

After the filtered sheet is displayed to the user, the client computer receives a user action inputted by the user, illustrated at 1308. The user action may be an edit, or mutation, or a user presence activity, such as highlighting or selecting one or more cells. The user action references the cells of the unfiltered sheet, not the filtered sheet. For example, if the user changes the data value in cell A1 (which is mapped to cell B2 by the first filter), the user action references cell A1. Likewise if the user selected cell A1. Thus cell A1 is changed in the local copy of the unfiltered sheet stored on the client computer. This user action, unchanged, is sent to the server, illustrated at 1310. The server stores a master copy of the first sheet that is unaffected by user selection of filters, so the user action may be directly applied to the master copy of the first sheet. The server may then send the user action to any other collaborators who are also currently accessing the spreadsheet. The collaborator client computers would transform the user action against any filters that has been applied to their local copies before displaying it. Transformation of collaborator user actions is discussed in relation to FIG. 14.

The user action is also transformed against the first filter on the client computer, illustrated at 1312. After the user action is transformed against the first filter, it references the cells of the filtered sheet. Thus a mutation to cell A1 is transformed to a mutation of cell B2. The filtered sheet is updated by the transformed user action and is then displayed to the user, illustrated at 1314. By maintaining the unfiltered sheet in memory and only determining the filtered sheet when displaying the sheet to the user, the client computer may send user actions directly to the server without the need to alter them. This allows the server and the client computer to communicate user actions directly to each other without an intervening layer of transformation to account for any filters applied by the user. In this manner method 1300 provides a way to process user actions on a collaborative spreadsheet when the user actions reference the unfiltered sheet.

Another method described herein discloses a way to process collaborator actions on a collaborative spreadsheet when collaborator actions reference unfiltered sheets. Method 1400 illustrated in FIG. 14 includes accessing an unfiltered sheet of a spreadsheet stored on a server to display on a client computer, where a plurality of filters is associated with the unfiltered sheet, and receiving a selection by a user of a first filter in the plurality of filters to be applied to the unfiltered sheet. The method further includes displaying a filtered sheet to the user, where the filtered sheet is obtained by applying the first filter to the unfiltered sheet, and receiving a collaborator action from the server, where the collaborator action references cells of the unfiltered sheet. The method further includes transforming the collaborator action against the first filter, and updating the display of the filtered sheet based on the transformed collaborator action. Method 1400 may be performed on any type of client computer that may connect to a cloud computing service, such as the client computer described in FIG. 3 or any desktop computer, laptop computer, tablet, smartphone, or such electronic device.

Method 1400 begins when a client computer accesses an unfiltered sheet of a spreadsheet stored on a server hosting a cloud computing service, illustrated at 1402. The master copy of the spreadsheet stored on the server contains one or more sheets. One or more filters may be associated with each sheet. The server allows multiple users on client computers concurrent access to the first sheet, as illustrated in FIG. 1. The spreadsheet may have an ACL that determines which users may access the spreadsheet, and each user's access level. When a user on a client computer accesses the first sheet, the cloud computing service sends a copy of the first sheet and the associated filters to the client computer. This copy is stored as a local copy on the client computer and is displayed to the user, for example through a web browser. A user interface on the web browser allows the user to view and edit the sheet, such as the user interfaces shown in FIGS. 4-7.

After the client computer accesses the unfiltered sheet from the server, the client computer receives a selection of a first filter to be applied to the unfiltered sheet, illustrated at 1404. The user interface may include a sidebar window, such as illustrated in FIG. 7, from which the user may select a filter to apply to a segment of data in the unfiltered sheet. The client computer then applies the first filter to the unfiltered sheet and displays the resultant filtered sheet, illustrated at 1406. The first filter is a mapping, or a transformation, between the cells of the unfiltered sheet and the cells of the filtered sheet. For example, the first filter may map cell A1 of the unfiltered sheet to cell B2 of the filtered sheet such then when the first filter is applied, the display of cell B2 displays the data value of cell A1. The local copy of the unfiltered sheet stored on the client computer is unaffected by the user's selection of the first filter. That is, the client computer does not overwrite the unfiltered sheet with the filtered sheet in memory. Rather, the filtered sheet is temporarily stored and displayed on the display screen of the client computer.

After the filtered sheet is displayed to the user, the client computer receives a collaborator action from the server, illustrated at 1408. The collaborator action may be a mutation or a collaborator presence activity, such as highlighting or selecting one or more cells, which a collaborator currently accessing the spreadsheet has made to the first sheet. The collaborator action references the cells of the unfiltered sheet, not the filtered sheet. For example, if the collaborator changes the data value in cell A1 (which is mapped to cell B2 by the first filter on the client computer), the collaborator action received from the server references cell A1. The client computer applies the collaborator action to the unfiltered sheet stored in memory. The server received the collaborator action from the collaborator and directly applied it to the master copy of the first sheet that the server stores. The server then sends the mutation to any other collaborators who are also currently accessing the spreadsheet.

After the client computer receives the collaborator action, it transforms the collaborator action against the first filter, illustrated at 1410. After the collaborator action is transformed against the first filter, it references the cells of the filtered sheet. Thus a mutation to cell A1 is transformed to a mutation of cell B2. The filtered sheet is updated by the transformed collaborator action and is then displayed to the user, illustrated at 1412. For example, cell B2 on the display screen of the client computer may be changed to reflect the collaborator's mutation. In the case of collaborator presence activity, the user interface on the web browser may show that the collaborator is currently highlighting cell B2. In this manner method 1400 provides a way to process collaborator actions on a collaborative spreadsheet when the user actions reference the unfiltered sheet.

Figure 15:
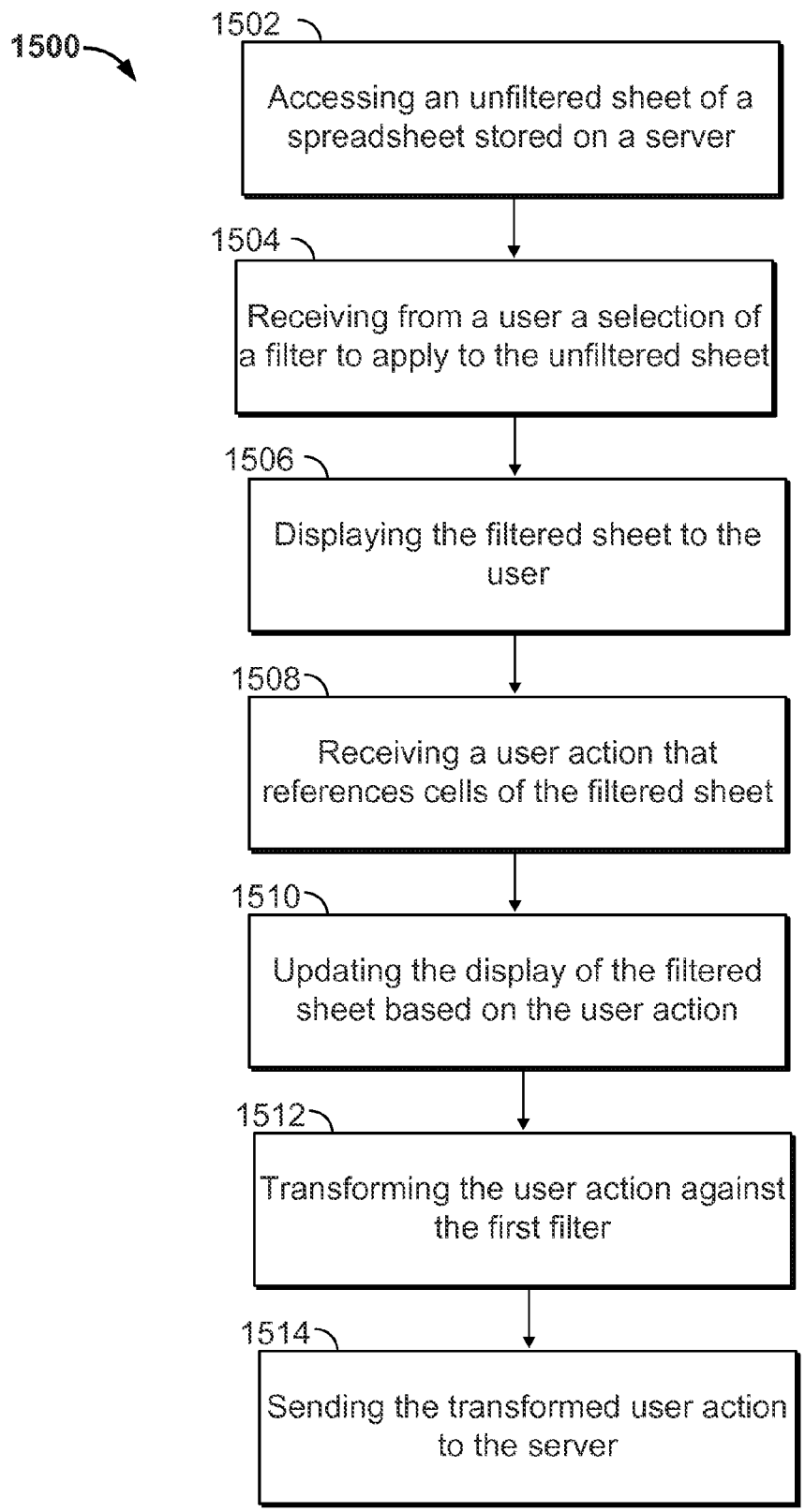
FIG. 15 shows another method for processing user actions on a collaborative spreadsheet in accordance with an implementation as described herein.

Another method described herein discloses a way to process user actions on a collaborative spreadsheet when user actions reference the filtered sheet. Method 1500 illustrated in FIG. 15 includes accessing an unfiltered sheet of a spreadsheet stored on a server to display on a client computer, where a plurality of filters is associated with the unfiltered sheet, and receiving a selection by a user of a first filter in the plurality of filters to be applied to the unfiltered sheet. The method further includes displaying a filtered sheet to the user, where the filtered sheet is obtained by applying the first filter to the unfiltered sheet, and receiving a user action inputted by a user on the client computer, where the user action references cells of the filtered sheet. The method further includes updating the display of the filtered sheet based on the user action, transforming the user action against an inverse of the first filter, and sending the transformed user action to the server. Method 1500 may be performed on any type of client computer that may connect to a cloud computing service, such as the client computer described in FIG. 3 or any desktop computer, laptop computer, tablet, smartphone, or such electronic device.

Method 1500 begins when a client computer accesses an unfiltered sheet of a spreadsheet stored on a server hosting a cloud computing service, illustrated at 1502. The master copy of the spreadsheet stored on the server contains one or more sheets. One or more filters may be associated with each sheet.

The server allows multiple users on client computers concurrent access to the first sheet, as illustrated in FIG. 1. The spreadsheet may have an ACL that determines which users may access the spreadsheet, and each user's access level. When a user on a client computer accesses the first sheet, the cloud computing service sends a copy of the first sheet and the associated filters to the client computer. This copy is stored as a local copy on the client computer and is displayed to the user, for example through a web browser. A user interface on the web browser allows the user to view and edit the sheet, such as the user interfaces shown in FIGS. 4-7.

After the client computer accesses the unfiltered sheet from the server, the client computer receives a selection of a first filter to be applied to the unfiltered sheet, illustrated at 1504. The user interface may include a sidebar window, such as illustrated in FIG. 7, from which the user may select a filter to apply to a segment of data in the unfiltered sheet. The client computer then applies the first filter to the unfiltered sheet and displays the resultant filtered sheet, illustrated at 1406. The first filter is a mapping, or a transformation, between the cells of the unfiltered sheet and the cells of the filtered sheet. For example, the first filter may map cell A1 of the unfiltered sheet to cell B2 of the filtered sheet such then when the first filter is applied, the display of cell B2 displays the data value of cell A1. The local copy of the unfiltered sheet stored on the client computer is overwritten by the filtered sheet, as opposed to the situation in method 1300 where the unfiltered sheet is not overwritten by the filtered sheet.

After the filtered sheet is displayed to the user, the client computer receives a user action inputted by the user, illustrated at 1508. The user action may be an edit, or mutation, or a user presence activity, such as highlighting or selecting one or more cells. The user action references the cells of the filtered sheet, not the unfiltered sheet. For example, if the user changes the data value in unfiltered cell A1 (which is mapped to cell B2 by the first filter), the user action references cell B2. Likewise if the user selected unfiltered cell A1. Thus cell B2 is changed in the local copy of the first sheet stored on the client computer. The filtered sheet is updated directly by the user action and is then displayed to the user, illustrated at 1510.

The user action is also transformed against the inverse of first filter on the client computer, illustrated at 1512. After the user action is transformed against the inverse of the first filter, it references the cells of the unfiltered sheet. Thus a mutation to cell B2 of the filtered sheet is transformed to a mutation of cell A1 of the unfiltered sheet. This transformed user action is sent to the server, illustrated at 1514. The server stores a master copy of the first sheet that is unaffected by user selection of filters, so the user action sent to the server should reference the cells of the unfiltered sheet rather than the filtered sheet. Otherwise, the server will change the wrong cell in its master copy. The server may then send the user action to any other collaborators who are also currently accessing the spreadsheet. The collaborator client computers would transform the user actions against any filters that have been applied to their local copies before displaying it. Transformation of collaborator actions is discussed in relation to FIG. 14. By maintaining the filtered sheet in memory, the client computer may display user actions without any intervening steps. This leads to a quicker time to display than method 1300. However, the user actions are transformed against the inverse of the filter before being sent to the server to maintain consistency with the server copy of the first sheet. In this manner method 1500 provides a way to process user actions on a collaborative spreadsheet when the user actions reference the filtered sheet.

In an alternative approach to method 1500, the client computer may send the untransformed user action to the server along with information about which filter the client computer is currently using. The server may then transform the user action against the inverse of the first filter. The user action may then be stored in server memory. The server may also transform the transformed user action against filters used by collaborators before sending the user action to the collaborators.

It will be apparent that aspects of the systems and methods described herein may be implemented in many different forms of software, firmware, and hardware in the implementations illustrated in the figures. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for processing user actions on a collaborative spreadsheet, the method comprising:
   accessing an unfiltered sheet of a spreadsheet stored on a server to display on a client computer, wherein a plurality of filters is associated with the unfiltered sheet;
   receiving a selection by a user of a first filter in the plurality of filters to be applied to the unfiltered sheet;
   displaying a filtered sheet to the user, wherein the filtered sheet is obtained by applying the first filter to the unfiltered sheet;
   receiving a user action inputted by a user on the client computer, wherein the user action references cells of the filtered sheet;
   updating the display of the filtered sheet based on the user action;
   transforming the user action against an inverse of the first filter; and
   sending the transformed user action to the server.

2. The method of claim 1, wherein the first filter includes a command to sort one or more cells of the unfiltered sheet.

3. The method of claim 1, wherein the first filter includes a command to hide one or more cells of the unfiltered sheet.

4. The method of claim 1, wherein accessing the unfiltered sheet includes loading a copy of the unfiltered sheet and the plurality of filters onto the client computer.

5. The method of claim 4, wherein displaying the filtered sheet comprises transforming the unfiltered sheet against the first filter.

6. The method of claim 1, wherein the filtered sheet is displayed on a web browser executing on the client computer.

7. The method of claim 6, wherein the web browser displays a user interface for the user to input the user action.

8. The method of claim 1, wherein the user action is a cell mutation.

9. The method of claim 1, wherein the user action is a cell presence activity.

* * * * *